United States Patent Office 2,744,845
Patented May 8, 1956

2,744,845
CHLORINATED MALEIC ADDUCT-ETHOXYLINE RESINOUS COMPOSITIONS

Hyman Rudoff, Schenectady, N. Y., assignor to General Electric Company, a corporation of New York No Drawing. Application August 22, 1952,
Serial No. 305,913

10 Claims. (Cl. 154—43)

This invention is concerned with novel resinous compositions of matter having good fire-retardant properties. More particularly, the invention relates to a composition of matter comprising (1) an adduct (obtained by a Diels-Alder condensation) of maleic anhydride and hexachlorocyclopentadiene (said adduct hereinafter referred to as a "chlorinated maleic adduct") and (2) a complex epoxide resin comprising a polyether derivative of a polyhydric organic compound, e. g., a polyhydric alcohol or phenol, containing epoxy groups, which for brevity will hereinafter be referred to as an "ethoxyline resin." The aforesaid chlorinated maleic adduct (hexachloroendomethylenetetrahydrophthalic anhydride) has the formula

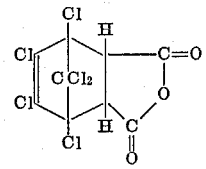

Heat-treated products and articles of manufacture derived from these compositions are also included within the scope of the invention.

U. S. Patent 2,324,483, Castan discloses epoxy resins or ethoxyline resins comprising the product of reaction of a phenol having at least two phenolic hydroxy groups and an epihalogenohydrin, e. g., epichlorohydrin, in which the said product contains at least two ethylene oxide groups, and which may be converted to the substantially thermoset stage by employing a polybasic carboxylic acid or anhydride, for instance, phthalic anhydride, as a cure accelerator. The resinous reaction products with which the polybasic carboxylic acid or anhydride is employed are generally complex resins comprising a polyether derivative of a polyhydric phenol containing epoxy groups, are commonly known as "ethoxyline resins" and are sold under the trade names of Epon or Araldite resins. These ethoxyline resins are cured generally by the use of acidic cure accelerators or alkaline cure accelerators, for instance, amines. However, it has been found that these cured ethoxyline resins undesirably support combustion, or, in other words, have poor flame-retardant properties. In addition, these ethoxyline resins when cured show undesirable decreases in strength and hardness at elevated temperatures. Moreover, it has been found that the electrical properties of the cured ethoxyline resins become poorer as the temperature rises. Finally, in order to cure these ethoxyline resins using, for instance, a dicarboxylic acid or anhydride as, for instance, phthalic acid or anhydride, fairly long periods of time at elevated temperatures are required to effect conversion of the ethoxyline resins to a substantially infusible and insoluble state.

I have now discovered that I can prepare cured ethoxyline resins of improved hardness and electrical properties at elevated temperatures and having improved fire retardant properties while at the same time being able to cure these ethoxyline resins in shorter periods of time than has heretofore been possible, by employing in combination with these ethoxyline resins a chlorinated maleic adduct of the type described above. More particularly, I found that the combination of an ethoxyline resin together with an adduct of maleic anhydride and hexachlorocyclopentadiene when heated at elevated temperatures gives products which have properties superior to the properties of mixtures of ethoxyline resins heretofore prepared and used for the same purpose. The mixtures of the ethoxyline resin and the chlorinated maleic adduct can be stored at room temperatures for relatively long periods of time without undesirable change in properties, and after such storage periods the mixture of ingredients can be converted to the substantially infusible and insoluble state without detriment to the properties of the finally cured product.

The ethoxyline resins defined above as being a complex epoxide resin comprising a polyether derivative of a polyhydric organic compound said derivative containing 1,2 epoxy groups are disclosed in various places in the art. Among such references may be mentioned the aforesaid Castan Patent 2,324,483, as well as Castan Patent 2,444,333, British Patent 518,057 and British Patent 579,698. For the most part, these ethoxyline resins are based on the resinous product of reaction between the epihalogenohydrin, for instance, epichlorohydrin, and a phenol having at least two phenolic hydroxy groups, for example, bis-(4-hydroxyphenyl) dimethylmethane. U. S. Patents 2,494,295; 2,500,600 and 2,511,913 also describe examples of ethoxyline resinous compositions which may be employed in the practice of the present invention. By reference, the aforementioned patents are intended to be part of the present description of the ethoxyline resins used and, for brevity, the ethoxyline resins will not be described other than that they contain more than one ethylene oxide group, e. g., from 1 to 2 or more epoxide groups, per molecule, and may be prepared by effecting reaction between a polyhydric phenol or alcohol, for example, hydroquinone, resorcinol, glycerine, and condensation products of phenols with ketones, for instance, bis-(4-hydroxyphenyl)-2,2-propane, with epichlorohydrin. For example, the reaction of epichlorohydrin with bis-(4-hydroxyphenyl)-2,2-propane may be formulated as follows:

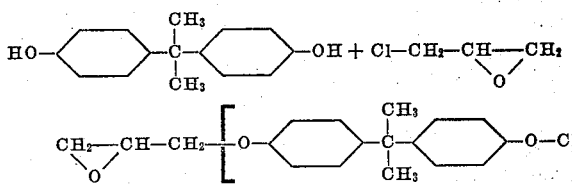 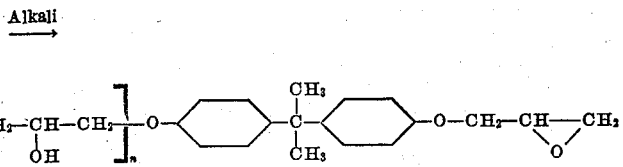

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

TABLE I

| Epon No. | Epoxide Equivalent | Approximate Esterification Equivalent | M. P., °C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

The complex epoxides used with the above-described chlorinated maleic adduct contain epoxide groups or epoxide and hydroxyl groups as their functional groups and are generally free from other functional groups such as basic and acidic groups.

The proportion of chlorinated maleic adduct and ethoxyline resin employed may be varied within limits depending on the application for which the mixture is intended, the type of ethoxyline resin employed, etc. Generally, I prefer to use the chlorinated maleic adduct in an amount ranging from about 5 to 70 per cent of the total weight of the ethoxyline resin and the chlorinated maleic adduct, the actual proportion of ingredients depending upon the application involved, the properties desired, the type of ethoxyline resin employed, the use of other modifying ingredients, etc. I prefer to employ the chlorinated maleic adduct and ethoxyline resin in such proportions that there is present in the mixture from approximately 0.8 to 1.2 equivalents of chlorinated maleic adduct for each equivalent of epoxide in the ethoxyline resin.

The method by which the chlorinated maleic adduct and the ethoxyline resin may be combined can, of course, be varied and presents no particular difficulty. Generally, it is merely necessary to add the chlorinated maleic adduct (which is a solid) to the ethoxyline resin and thereafter heat the mixture of ingredients at temperatures ranging, for example, from about 80° to 150° C. or higher until a homogeneous mixture is obtained. Upon further heating the desired cure of the mixture is effected, such further heating being carried out at elevated temperatures ranging, for instance, from about 100° to 200° C. whereby transformation to the solid, infusible, insoluble state is attained. The mixture of ingredients comprising the chlorinated maleic adduct and the ethoxyline resin, which is generally a liquid of varying viscosity, depending on the molecular weight of the latter, can be poured into molds and by further heat treatment can be converted to a solid thermoset casting with little shrinkage and without the evolution of appreciable amounts of by-products such as water. If desired, the mixture of the ethoxyline resin and the chlorinated maleic adduct can be dissolved in solvents, for instance, toluene, ketones such as acetone, etc., and used as a laminating and impregnating varnish for various papers, cloths, fabrics, etc. Alternatively, solutions of the aforesaid combination ingredients can be used as adhesives and in such an application this particular use of the mixture of ingredients is especially applicable because of the good adhesion between the mixture of the ethoxyline resin and the chlorinated maleic adduct and various metallic and non-metallic surfaces.

If desired, other ingredients may be added to the mixture of the ethoxyline resin and the chlorinated maleic adduct. I have found that varying percentages of organic dicarboxylic acids or anhydrides, e. g., adipic acid, phthalic anhydride, etc. may be used in combination with the chlorinated maleic adduct. Additional acidic compositions which may be included are those employed with ethoxyline resins as is more particularly disclosed and claimed in Cass applications Serial Nos. 254,207 and 254,208 and in Doyle application Serial No. 254,213, all the aforesaid applications being filed October 31, 1951, and assigned to the same assignee as the present invention. Unexpectedly it was found that relatively large amounts of such curing agents as dicarboxylic acids or anhydrides, for example, phthalic anhydride, could be added to the mixture of the ethoxyline resin and the chlorinated maleic adduct, and that the amount of the more expensive latter ingredient could be materially reduced while at the same time maintaining good fire-retardant properties. Thus, on a weight basis based on the weight of the chlorinated maleic adduct, I found that for each part of the latter employed, I may use, for instance, from 0.01 to 3 parts of phthalic anhydride without materially affecting the flame-retardant properties of the cured or converted ethoxyline resin.

In order that those skilled in the art may better understand how the present invention may be practiced, the following examples are given by way of illustration and not by way of limitation. All parts are by weight.

Example 1

In this example, two ethoxyline resins manufactured by Shell Development Corporation, namely, Epon RN 48 (epoxide equivalent 192) and Epon RN 34 (epoxide equivalent 225–290), were each thoroughly mixed with the chlorinated maleic adduct described above and heated for about two hours at about 125° C. to give a rigid hard product which was no longer fusible. Samples of each of these cured compositions were then tested for fire-retardant properties in accordance with ASTM D635–44. In addition, the heat distortion points of these two samples were determined in accordance with ASTM D643. The following Table II shows the weight per cent of chlorinated maleic adduct (based on the total weight of the latter and ethoxyline resin) employed in connection with the two samples described above, as well as the results of the various flammability, heat distortion and hardness tests conducted on the samples. Table II also shows the properties of cured ethoxyline resins from which the chlorinated maleic adduct was omitted and in its place was employed phthalic anhydride as the cure accelerator; the results for the latter cured composition are based on the best data previously reported in the literature on cured ethoxyline resins.

TABLE II

|  | Sample 1 | Sample 2 | Properties of Phthalic Anhydride Hardened Ethoxyline Resins |
|---|---|---|---|
| Epon Resin | RN48 | RN34 |  |
| Percent, by weight, chlorinated maleic adduct | 69.8 | 63.7 |  |
| Flammability of cured product | Self-extinguishing. | Self-extinguishing. | Burns easily. |
| Heat distortion | 162° C. | 172° C. | 109° C. |
| Barcol Hardness: |  |  |  |
| 26° C | 27 | 29 | 18. |
| 125° C | 14 | 19 | 0. |

Example 2

In this example, 17.6 parts of the chlorinated maleic adduct and 10 parts of an ethoxyline resin having an epoxide equivalent of from 225 to 290 (Epon RN34) were thoroughly mixed together and heated at 160° C. for about 16 hours. This cured product, which had an ASTM heat distortion point of about 172° C. (as compared to a 109° C. heat distortion of a cured ethoxyline resin having an epoxide equivalent of about 247 employing 30 parts of phthalic anhydride to 100 parts of the ethoxyline resin), was then tested for electrical properties at various temperatures. The following Table III shows the power factor, dielectric constant, and resistivity of the cured ethoxyline resin containing the chlorinated maleic adduct.

TABLE III

| Temperature, ° C. | Percent Power Factor at 30 v./mil | Dielectric Constant | Resistivity, Ohms |
|---|---|---|---|
| 25 | 0.493 | 3.5 | $2.7 \times 10^{15}$ |
| 65 | 0.154 | 3.5 | $2.7 \times 10^{15}$ |
| 100 | 0.122 | 3.5 | $2.7 \times 10^{15}$ |
| 130 | 0.173 | 3.5 | $2.7 \times 10^{15}$ |
| 150 | 0.190 | 3.5 | $0.33 \times 10^{15}$ |

It is interesting to note that the power factor was lower at the elevated temperatures than it was at room temperatures. This is contrary to the general findings of power factors of resinous compositions where increases in power factor occur as the temperature increases. Of additional interest is the fact that a laminated panel made from a varnish comprising the aforementioned mixture of ethoxyline resin and chlorinated maleic adduct in a solvent comprising toluene, which was used to impregnate sheets of glass cloth which were thereafter superposed upon each other and pressed under heat and pressure for about 16 hours at about 160° C., at 200 p. s. i., had a dielectric strength of about 288 volts per mil.

*Example 3*

As pointed out previously, the fire retardant properties of the ethoxyline resins are materially improved by the incorporation of the chlorinated maleic adduct. It has also been found that the cost of the composition may be materially reduced without reducing the fire retardant properties by incorporating a less expensive curing agent, particularly phthalic anhydride, in combination with the chlorinated maleic adduct. In this example an ethoxyline resin having an epoxide equivalent of about 247 (specifically Araldite CN501) was mixed in various proportions with the chlorinated maleic adduct and phthalic anhydride and cured for about 3 hours at 150° C. Thereafter, the flammability of the samples was tested in accordance with ASTM D635–44 with the results described in Table IV.

TABLE IV

| Parts Ethoxyline Resin | Parts Chorinated Maleic Adduct | Parts Phthalic Anhydride | Flammability |
| --- | --- | --- | --- |
| 10 | 7.5 | 0.0 | Extinguished in 0–1 second. |
| 10 | 6.6 | 0.8 | Do. |
| 10 | 5.7 | 65.0 | Do. |
| 10 | 4.7 | 2.2 | Do. |
| 10 | 2.8 | 3.0 | Extinguished in 0–3 seconds. |
| 10 | 1.9 | 4.5 | Extinguished in 3–5 seconds. |
| 10 | 1.0 | 5.2 | Burns. |

It will be noted that despite the presence of only small amounts of the chlorinated maleic adduct and relatively large amounts of the phthalic anhydride, the flame retardant properties of the cured ethoxyline resin were still very good.

One of the advantages realized in using the chlorinated maleic adduct in combination with ethoxyline resin in place of phthalic anhydride is the fact that it has been found that for comparable cures, less time and lower temperatures are required for obtaining these states of cure than when one employs, for instance, a dicarboxylic acid or anhydride, particularly phthalic anhydride, as the cure accelerator. Thus, it has been found that for an equivalent state of cure using an ethoxyline resin having an epoxide equivalent of 247 (Araldite CN501) when employing phthalic anhydride as a cure accelerator, at least 3 hours at 150° C. were required to obtain the desired cure. In contrast to this, when the phthalic anhydride was replaced by the chlorinated maleic adduct, it was found that the ethoxyline resin could be cured to the same state of cure in about one hour at 125° C. and less than one hour at 150° C.

The compositions of matter herein described have utility in many applications. Thus, various useful solutions of the mixtures of the chlorinated maleic adduct and the ethoxyline resins may be prepared by using different low boiling solvents. Such solvent materials are, for example, acetone, cyclohexanone, methyl ethyl ketone, etc., to which aromatic diluents such as benzene, toluene, etc. can be added. When solutions of the mixture of resins are prepared, the solutions may be used as surface coatings, as adhesives, as impregnating agents for various sheet materials including sheets of cloth, paper, asbestos, mica, glass cloth, etc. Laminated products may be prepared by treating the sheet material with the solution comprising the mixture of ethyloxyline resin and the chlorinated maleic adduct and evaporating substantially all the solvent and thereafter superposing the sheets upon each other and molding the assembly under heat and pressure for a time sufficient to cure the laminated product. In such instances, temperatures of the order of about 150° to 200° C. for times ranging from about one-quarter to six hours are advantageously used.

Various molded products may also be prepared using the mixture of ethyloxyline resin and chlorinated maleic adduct, and adding a filler and other modifying ingredients such as pigments, dyes, lubricants, etc. to the mixture. If desired, the filler may be placed in a solution of the mixture of ethoxyline resin and chlorinated maleic adduct and the solvent thereafter evaporated to give a filler material coated with the resinous mixture. Among such fillers may be mentioned titanium dioxide, various clays, iron oxide, carbon, graphite, asbestos fibers, finely divided mica, wood flour, etc. Magnets may also be prepared by employing, for instance, magnetic materials such as Alnico powder with the mixture of the ethoxyline resin and the chlorinated maleic adduct and thereafter casting or molding the mixture. Combinations of other resins, such as alkyd resins, phenolic resins, urea resins, etc., with the mixture of ethoxyline resin and chlorinated maleic adduct, may also be employed and which can be readily cured to give useful products.

From the foregoing examples it is apparent that the properties of the final polymer comprising the ethoxyline resin and the chlorinated maleic adduct (either as a modifying agent or curing agent) are superior to those in which the ethoxyline resin employs other curing agents, particularly organic dicarboxylic acids or anhydrides. The properties of the final polymer will be varied depending on such factors as the type of ethoxyline resin employed, the proportion of ethoxyline resin and chlorinated maleic adduct, the presence of modifying ingredients, such as phthalic anhydride, the application for which the composition is intended, etc.

What I claim as new and desire to secure by Letters Patent of the United States is:

1. A composition of matter comprising (1) a complex epoxide resin comprising a polyether derivative of a polyhydric organic compound, said derivative containing 1,2 epoxy groups, said compound being selected from the class consisting of polyhydric alcohols and phenols containing at least two phenolic hydroxy groups, and (2) from 0.8 to 1.2 equivalents of hexachloroendomethylenetetrahydrophthalic anhydride for each equivalent of epoxide in said epoxide resin.

2. A composition of matter comprising (1) a complex epoxide resin comprising (1) a polyether derivative of a polyhydric organic compound, said derivative containing 1,2 epoxy groups, said compound being selected from the class consisting of polyhydric alcohols and phenols containing at least two phenolic hydroxy groups, (2) hexachloroendomethylenetetrahydrophthalic anhydride, and (3) phthalic anhydride, said hexachloroendomethylenetetrahydrophthalic anhydride and phthalic anhydride being present in the combined amount of from about 0.8 to 1.2 equivalents for each equivalent of epoxide in said epoxide resin, said phthalic anhydride being present in the amount of from about 0.01 to 3 parts by weight for each part by weight of hexachloroendomethylenetetrahydrophthalic anhydride.

3. A composition of matter comprising (1) a complex epoxide resin comprising a polyether derivative of a polyhydric phenol, said derivative containing 1,2 epoxy groups and obtained by reacting bis-(4-hydroxyphenyl)-2,2-propane and epichlorohydrin, and (2) from about 0.8 to 1.2 equivalents of hexachloroendomethylenetetrahydrophthalic anhydride for each equivalent of epoxide in said epoxide resin.

4. A composition of matter obtained by heating a mixture of ingredients comprising (1) a complex epoxide resin comprising a polyether derivative of a polyhydric organic compound, said derivative containing 1,2 epoxy groups, said compound being selected from the class consisting of polyhydric alcohols and phenols containing at least two phenolic hydroxy groups, and (2) from about 0.8 to 1.2 equivalents of hexachloroendomethylenetetrahydrophthalic anhydride for each equivalent of epoxide in said epoxide resin.

5. A composition of matter obtained by heating a mixture of ingredients comprising (1) a complex epoxy resin comprising a polyether derivative of polyhydric compound, said derivative containing 1,2 epoxy groups, said compound being selected from the class consisting of polyhydric alcohols and phenols containing at least two phenolic hydroxy groups, (2) hexachloroendomethylenetetrahydrophthalic anhydride, and (3) phthalic anhydride, said hexachloroendomethylenetetrahydrophthalic anhydride and phthalic anhydride being present in the combined amount of from about .8 to 1.2 equivalents for each equivalent of epoxide in said epoxy resin, said phthalic anhydride being present in the amount from about 0.01 to 3 parts by weight for each part by weight of hexachloroendomethylenetetrahydrophthalic anhydride.

6. A composition of matter obtained by heating a mixture of ingredients comprising (1) a complex epoxy resin comprising a polyether derivative of a polyhydric phenol, said derivative containing 1,2 epoxy groups, and obtained by reacting bis-(4-hydroxyphenyl)-2,2-propane and epichlorohydrin, and (2) from .8 to 1.2 equivalents of hexachloroendomethylenetetrahydrophthalic anhydride for each equivalent of epoxide in said epoxy resin.

7. A molded article comprising a heat-treated product of a mixture of ingredients comprising (1) a filler, (2) a complex epoxide resin comprising a polyether derivative of a polyhydric organic compound, said derivative containing 1,2 epoxy groups, said compound being selected from the class consisting of polyhydric alcohols and phenols containing at least two phenolic hydroxy groups, and (3) from .8 to 1.2 equivalents of hexachloroendomethylenetetrahydrophthalic anhydride for each equivalent of epoxide in said epoxide resin.

8. An article of manufacture comprising a laminated product composed of a plurality of sheets coated with a mixture or ingredients comprising (1) a complex epoxy resin comprising a polyether derivative of a polyhydric organic compound, said derivative containing 1,2 epoxy groups, said compound being selected from the class consisting of polyhydric alcohols and phenols containing at least two phenolic hydroxy groups, and (2) from .8 to 1.2 equivalents of hexachloroendomethylenetetrahydrophthalic anhydride for each equivalent of epoxide in said epoxy resin.

9. The process which comprises (a) forming a mixture of ingredients comprising (1) a complex epoxide resin containing a polyether derivative of a polyhydric organic compound, said derivative containing 1,2 epoxy groups, said compound being selected from the class consisting of polyhydric alcohols and phenols containing at least two phenolic hydroxy groups, and (2) from .8 to 1.2 equivalents of hexachloroendomethylenetetrahydrophthalic anhydride for each equivalent of epoxide in said epoxide resin, and (b) heating the aforesaid mixture for a time and at a temperature to effect intercondensation between the ingredients.

10. The process which comprises (a) forming a mixture of ingredients comprising (1) a complex epoxide resin comprising a polyether derivative of a polyhydric organic compound, said derivative containing 1,2 epoxy groups, said compound being selected from the class consisting of polyhydric alcohols and phenols containing at least two phenolic hydroxy groups, (2) hexachloroendomethylenetetrahydrophthalic anhydride, and (3) phthalic anhydride, said hexachloroendomethylenetetrahydrophthalic anhydride and phthalic anhydride being present in the combined amount of from about .8 to 1.2 equivalents for each equivalent of epoxide in said epoxide resin, said phthalic anhydride being present in the amount of from about 0.01 to 3 parts by weight for each parts by weight of hexachloroendomethylenetetrahydrophthalic anhydride and (b) heating the aforesaid mixtures of ingredients until intercondensation of the ingredients has taken place.

References Cited in the file of this patent

UNITED STATES PATENTS

| 2,324,483 | Castan | July 20, 1943 |
| 2,504,518 | Greenlee | Apr. 18, 1950 |
| 2,606,910 | Herzfeld | Aug. 12, 1952 |

FOREIGN PATENTS

| 491,576 | Great Britain | Nov. 28, 1936 |
| 930,609 | France | Aug. 18, 1947 |

OTHER REFERENCES

Organic Analysis, Column 1, New York, 1953, chapter by Jungnickel et al., pages 127 and 128.